United States Patent
Mikami et al.

(10) Patent No.: US 12,121,874 B2
(45) Date of Patent: Oct. 22, 2024

(54) WATER PURIFYING MATERIAL HAVING IRON AS MAIN COMPONENT, AND METHOD FOR MANUFACTURING SAME

(71) Applicant: SUGITA WIRE, LTD., Tokyo (JP)

(72) Inventors: Yasuie Mikami, Tokyo (JP); Shigemi Kodama, Tokyo (JP); Shigeo Kimura, Tokyo (JP)

(73) Assignee: SUGITA WIRE, LTD., Tokyo (JP)

( * ) Notice: Subject to any disclaimer, the term of this patent is extended or adjusted under 35 U.S.C. 154(b) by 554 days.

(21) Appl. No.: 17/619,848

(22) PCT Filed: Jun. 16, 2020

(86) PCT No.: PCT/JP2020/023586
§ 371 (c)(1),
(2) Date: Dec. 16, 2021

(87) PCT Pub. No.: WO2020/255956
PCT Pub. Date: Dec. 24, 2020

(65) Prior Publication Data
US 2022/0347649 A1 Nov. 3, 2022

(30) Foreign Application Priority Data

Jun. 20, 2019 (JP) .................. 2019-114385

(51) Int. Cl.
*B01J 20/02* (2006.01)
*B01J 20/04* (2006.01)
(Continued)

(52) U.S. Cl.
CPC ....... *B01J 20/0229* (2013.01); *B01J 20/0248* (2013.01); *B01J 20/04* (2013.01);
(Continued)

(58) Field of Classification Search
CPC .... B01J 20/0229; B01J 20/0248; B01J 20/04; B01J 20/103; B01J 20/3035;
(Continued)

(56) References Cited

U.S. PATENT DOCUMENTS 8,231,790 B2   7/2012  Yanagita
8,759,252 B1*  6/2014  Callaway ............. B01J 20/3021
                                                96/108
(Continued)

FOREIGN PATENT DOCUMENTS

CN        1698948 A    11/2005
CN    103 086 498 A     5/2013
(Continued)

OTHER PUBLICATIONS

Office Action issued in CN Patent Application No. 202080044829.5, Nov. 1, 2023, translation.
(Continued)

*Primary Examiner* — Brian A McCaig
(74) *Attorney, Agent, or Firm* — GREENBLUM & BERNSTEIN, P.L.C.

(57) ABSTRACT

Provided is a purifying material capable of highly efficiently removing contaminant components from wastewater. A water purifying material having a composition of 30 to 40% total iron, 1 to 5% titanium, 0.1 to 1% magnesium, and 0.1 to 0.8% silica (silicon), and a method for manufacturing the water purifying material including: adding caustic soda to a solution containing 200 to 100 mg/L of bivalent iron, 20 to 100 mg/L of titanium ions, 5 to 50 mg/L of magnesium, and 3 to 30 mg/L of silica under conditions of 30 to 50° C. and pH 6.8 to 7.2 to carry out neutralization and reaction; separating and collecting an obtained solid at 100° C. or less; and drying the collected solid.

5 Claims, 3 Drawing Sheets

(51) Int. Cl.
  *B01J 20/10* (2006.01)
  *B01J 20/30* (2006.01)
(52) U.S. Cl.
  CPC ......... *B01J 20/103* (2013.01); *B01J 20/3035* (2013.01); *B01J 20/3078* (2013.01)
(58) Field of Classification Search
  CPC ........... B01J 20/3078; B01J 2220/4875; C02F 1/004; C02F 1/281; C02F 1/38; C02F 1/5245; C02F 1/66; C02F 2101/105; C02F 2101/16; C02F 2103/007; C02F 2103/08; C02F 2103/20
  See application file for complete search history.

(56) References Cited

U.S. PATENT DOCUMENTS

| | | |
|---|---|---|
| 2002/0077249 A1 | 6/2002 | Schlegel et al. |
| 2010/0230360 A1 | 9/2010 | Yanagita |

FOREIGN PATENT DOCUMENTS

| | | |
|---|---|---|
| JP | 7-214081 | 8/1995 |
| JP | 2000-342960 A | 12/2000 |
| JP | 2005-087833 | 4/2005 |
| JP | 2005-087834 | 4/2005 |
| JP | 2005-118614 A | 5/2005 |
| JP | 2005-144304 | 6/2005 |
| JP | 2005-144420 | 6/2005 |
| JP | 2006-110470 | 4/2006 |
| JP | 2006-124239 | 5/2006 |
| JP | 2007-001835 | 1/2007 |
| JP | 2007-001835 A | 1/2007 |
| JP | 3961558 | 8/2007 |
| JP | 2008-238131 A | 10/2008 |
| WO | 2010/140968 A1 | 12/2010 |
| WO | 2019/070574 A1 | 4/2019 |

OTHER PUBLICATIONS

ISR issued in International Patent Application No. PCT/JP2020/023586, Aug. 25, 2020, translation.
IPRP issued in International Patent Application No. PCT/JP2020/023586, Dec. 21, 2021, translation.
Office Action issued in TW Patent Application No. 109120814, Nov. 21, 2021, translation.
Office Action issued in JP Patent Application No. 2019-114385, Apr. 20, 2022, translation.
Office Action issued in CN Patent Application No. 202080044829.5, Mar. 12, 2024, translation.
Decision of Refusal issued in in JP Patent Application No. 2019-114385, Sep. 21, 2022, translation.
Office Action issued in CN Patent Application No. 202080044829.5, May 6, 2023, translation.
EESR issued in EP Patent Application No. 20827346.6, Apr. 4, 2023.

\* cited by examiner

WATER PURIFYING MATERIAL HAVING IRON AS MAIN COMPONENT, AND METHOD FOR MANUFACTURING SAME

TECHNICAL FIELD

The present invention relates to a purifying material used for purifying water contaminated with phosphorus, ammonia, nitrous acid, nitric acid, and the like, and a method for manufacturing the same. The purifying material of the present invention is particularly suitably used for purifying rearing water used for cultivating fish and rearing aquarium fish. Fish rearing water include river water, seawater, and lake and marsh water.

BACKGROUND ART

Since fish rearing water is contaminated with fish excrement and food residues, contaminants in the rearing water are commonly removed with a filter or a purifying material in which the filter is combined with an adsorbent such as activated carbon while the rearing water is circulated.

However, since conventional adsorbents cannot completely remove phosphorus, ammonia, nitrous acid, nitric acid, and the like, blooms of blue-green algae and the like are unavoidable. Wall surfaces of rearing tanks are therefore required to be periodically cleaned.

Addition of a very small amount of a germicide into water is effective as means for preventing blooms of algae such as blue-green algae but is not suitable for rearing water for cultivation of edible fish.

Proposed examples of a purifying agent that adsorbs and removes phosphorus components in water include a material having a large specific surface area obtained by neutralizing iron oxyhydroxide (Patent Literature 1), a material obtained by neutralizing a liquid mixture of ferrous sulfate and ferric sulfate such that the material has a composition of $Fe(OH)m(SO4)n \cdot 1H2O$ (where $2 \leq m < 3$, $0 < n \leq 0.5$, and $0 \leq 1 < 0.5$) (Patent Literature 2), a material obtained by impregnating a porous ceramic granule obtained by mixing and sintering titanium oxide, zirconia, zeolite, ferric oxide, and manganese oxide, with microorganisms (Patent Literature 3), an amorphous anion adsorbent containing ferric hydroxide obtained by adding to an aqueous solution of ferrous iron an oxidizing material in an amount less than the equivalent amount of the ferrous iron and then adding an alkali such that the pH is adjusted to 1.5-5.5 (Patent Literature 4), and a material obtained by forming and allowing a photocatalyst film to be supported on a surface of at least one porous carrier selected from activated carbon, zeolite, silica gel, pearlite, porous glass, and the like by evaporation or vacuum deposition or by impregnating the porous carrier with a solution or dispersion of an organometallic compound serving as a photocatalyst and performing decomposition by heating (Patent Literature 5).

These purifying agents show improved removal ratios of phosphorus compared with conventional adsorbents, but algae such as blue-green algae grow with a very small amount of nutrients, so that blooms of algae cannot be completely prevented.

As described above, development of a purifying agent that is safe for bred fish and can prevent blooms of algae for a longer period has been desired.

CITATION LIST

Patent Literature

Patent Literature 1

Japanese Patent Laid-Open No. 2006-124239

Patent Literature 2

Japanese Patent Laid-Open No. 2007-001835

Patent Literature 3

Japanese Patent Laid-Open No. 2005-144304

Patent Literature 4

Japanese Patent No. 3961558

Patent Literature 5

Japanese Patent Laid-Open No. 2006-110470

SUMMARY OF INVENTION

Technical Problem

An object of the present invention is to provide a purifying agent that can remove phosphorus, ammonia, nitrous acid, nitric acid, and the like in contaminated water at the same time, is safe for bred fish when applied to purification of fish rearing water, and can prevent blooms of algae in rearing water completely or for a longer period.

Solution to Problem

Since a flocculant for water treatment having polyferric sulfate as a main component was developed, the present inventors have investigated the shape (such as α, β, γ, and amorphous) of ferric hydroxide revealed at the time of manufacture and use and a removal property on harmful substances and carried out various examinations to find that a material obtained by filtering and drying a neutralized product obtained by neutralizing a solution containing bivalent iron ions, sulfuric acid radicals, chlorine ions, titanium ions, magnesium ions, and silica (silicon ions) at a specific formulation with caustic soda under specific conditions shows a high performance as a water treatment material. The present invention has thus been completed.

The present inventors have carried out various examinations of manufacture of polyferric sulfate as described above to also find that the above conditions of an iron-containing solution are satisfied by mixing a waste liquid generated in manufacture of the polyferric sulfate with a waste liquid discharged in a pickling process relating to the steel industry and adjusting the mixture. Use of these waste liquids as raw materials can reduce the cost of manufacture of the purifying agent of the present invention, leading to the cost of treatment of the waste liquid discharged in the manufacturing process of polyferric sulfate and a pickling process relating to the steel industry.

Modes for carrying out the present invention are as follows.

[1] A water purifying material having a composition of 30 to 40% total iron, 1 to 5% titanium, 0.1 to 1% magnesium, and 0.1 to 0.8% silica (silicon) in terms of weight ratio.

[2] A method for manufacturing a water purifying material including adding caustic soda to a solution containing 200 to 100 mg/L of bivalent iron, 20 to 100 mg/L of titanium ions, 5 to 50 mg/L of magnesium, and 3 to 30 mg/L of silica under conditions of 30 to 50° C. and pH 6.8 to 7.2 to carry out neutralization and reaction; separating and collecting an obtained solid at 100° C. or less; and drying the collected solid.

[3] The method for manufacturing a water purifying material according to [2], in which the solution is prepared by combining a waste liquid discharged from a manufacturing process of polyferric sulfate and a waste liquid discharged from a pickling process relating to the steel industry.

[4] The method for manufacturing a water purifying material according to [2] or [3], in which iron in the solution includes ferric sulfate ($Fe^{+2}$) or a mixture of ferric sulfate ($Fe^{+2}$) and ferrous sulfate ($Fe^{+3}$).

The formulation proportion of components of the purifying material of the present invention is represented in terms of weight ratio based on each element. For example, 30% total iron is calculated by dividing the analyzed (weight) value of iron contained in the sample by the total weight of the sample, that is, the weight of Fe/the total weight×100.

The present invention is described in further detail. The pH is adjusted to 6.8 to 7.2 at the time of neutralization because the product contains the largest content of the amorphous product and shows the best adsorption capacity in this range. Crystals of magnetite tend to be formed at pH 7.2 or more, and the product mostly becomes magnetite at pH 9 or more. At pH 6.8 or less, a portion of bivalent iron is dissolved as ions to reduce the amount of a precipitate to be formed, and $Fe^{+2}$ remains in the solution.

The temperature at the time of neutralization is set to 30° C. or more because the reactivity is poor at 30° C. or less, leading to poor formation of anatase $TiO_4$, compounds of Fe, Mg, and Si, and amorphous hydroxides of Fe by reactions of Fe, Mg, Si, and Ti, and because heating is required to reach 50° C. or more, which requires high costs and is impractical. By setting the temperature at the time of neutralization to 30 to 50° C. as described above, the purifying agent can be manufactured at a low cost.

Among metal components other than iron contained in the purifying agent of the present invention, titanium and magnesium are contained in the waste liquid from the manufacturing process of polyferric sulfate, and silica is contained in the waste liquid from a filtering process and a pickling process. Among these components, titanium functions as a photocatalyst, but a titanium content of 5% or more has adverse effects on adsorption of phosphorus (P), which is not preferable. The function as a photocatalyst is not sufficiently fulfilled when the content is 1% or less.

If the composition proportion of the purifying agent of the present invention greatly deviates from the above range, the adsorption capacity of the contaminant components is reduced. The reason is not clear but is considered to be formation of Fe, Mg, and Si compounds such as compounds similar to magnesium aluminate and zeolite, more specifically, insufficiently crystallized compounds such as a compound similar to zeolite in which Mg and $Fe^{3+}$ are substituted respectively for M and Al in a common rational formula $Mn+x/nAl_xSi_yO_{2x+2y}x\cdot zH_2O$ of zeolite, a zeolite type compound containing Al and $Fe^{3+}$ if Al exists, $MgO\cdot SiO_2\cdot nH_2O$, and $Mg_3SiO_4O_{10}(OH)_2$, and the contaminant components in the wastewater is supposed to be highly efficiently removed with the superior adsorption capacity.

In the present invention, the amount of caustic soda is sufficient to allow the entire dissolved metal compounds to be insolubilized, and caustic soda may be added to the solution such that the pH falls within the range of 6.8 to 7.2 while observing the state of precipitation of a solid. Addition of caustic soda is preferably controlled by linking with a pH meter.

Known means can be used for the addition as long as an aqueous solution of caustic soda can be added and mixed to a solution in small quantities. For example, a reaction vessel provided with stirring means may be used.

The method for separating the solid formed after the neutralization reaction from the solution can be of any type as long as heating is not involved, and examples include a filter press for pressure filtration and a centrifuge used in sludge treatment for centrifugation.

Means for drying the collected solid can be of any type as long as the method does not involve heating to 100° C. or more, and examples include solar drying, natural drying, and a vacuum dryer utilizing waste heat. If the solid is heated to 100° C. or more, the physical properties of the solid change, and the adsorption performance is impaired.

Advantageous Effects of Invention

With the purifying agent of the present invention, very small amounts of phosphorus, ammonia, nitrous acid, nitric acid, and the like contained in water can be removed more efficiently than conventional articles, and in particular, if applied to fish rearing water, phosphorus content in the water can be highly efficiently removed, so that blooms of blue-green algae and adhesion of blue-green algae to glass surfaces can be prevented for a long period.

Further, use of a waste liquid discharged in the manufacturing process of polyferric sulfate and a waste liquid discharged in a pickling process relating to the steel industry as raw materials reduces the cost of manufacture and the cost of treatment of the waste liquids.

DESCRIPTION OF EMBODIMENTS

Example 1

A comparative experiment of the phosphorus adsorption capacity between a purifying material of the present invention (hereinafter referred to as "article of the present invention") and a conventional article was conducted.

The purifying material of the present invention was prepared as follows.

(1) 0.01 m³ of a waste liquid discharged in the manufacturing process of polyferric sulfate and 1 m³ of a waste liquid discharged in the pickling process relating to the steel industry were mixed.

The liquid mixture had pH 2.5 and a temperature of 40° C.

(2) The liquid mixture was neutralized with caustic soda to pH 6.8.

(3) The solid obtained was collected with a pressure filter.

(4) The solid separated was dried with a hot air device.

The solid obtained in this manner was powdery and had a composition of 30 to 40% total iron, 1 to 5% titanium, 0.1 to 1% magnesium, and 0.1 to 0.8% silica (silicon) in terms of weight ratio.

As the conventional article, iron hydroxide (hereinafter referred to as a "conventional article"), which is the main component of a commercially available purifying material, was used.

As the phosphorus-containing waste liquid used for the experiment, a solution that contained potassium dihydrogen phosphate dissolved and had a phosphoric acid concentration adjusted to 50 mg/L was used as a sample.

In the experiment, 300 ml of a phosphoric acid solution having a concentration of 50 mg/L in which potassium dihydrogen phosphate had been dissolved was poured into two beakers, 3 g each of the purifying agent of the present invention and iron hydroxide was added to these beakers, the mixtures were stirred for 1 minute once a day, and the phosphorus concentrations were measured every 24 hours after the start.

Figure 1:
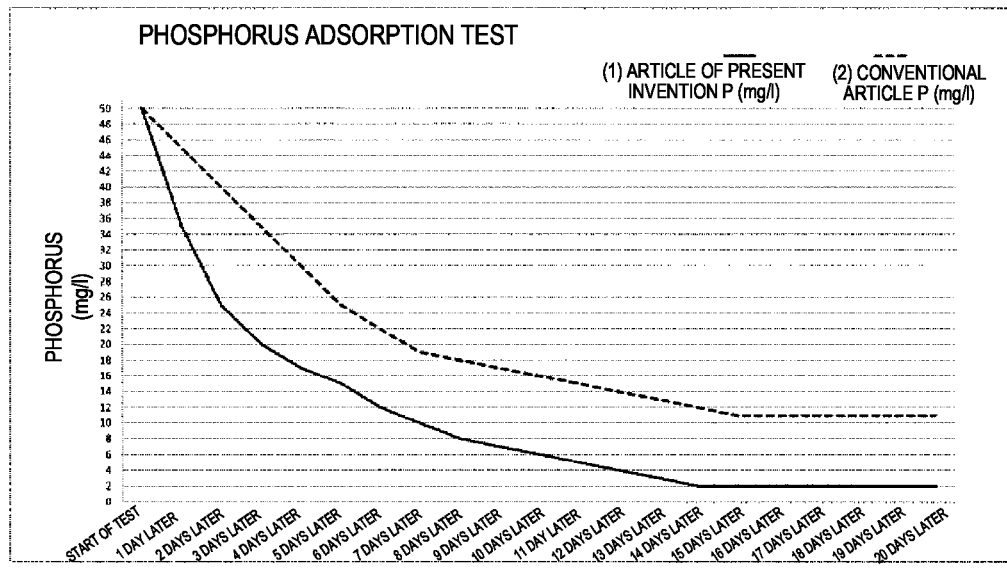
FIG. 1 is a graph showing the result of a comparative test of the phosphorus adsorption capacity between the article of the present invention and the conventional article in Example 1.

FIG. 1 shows the result.

The phosphorus adsorption was 4.80 mg/g for the article of the present invention and 3.8 mg/g for the conventional article. It was found that the article of the present invention was superior in adsorption capacity. The phosphorus concentration in the wastewater more quickly decreased in the case of the article of the present invention until the 4th day, but the speed of decrease was slowed down to reach a constant concentration after the 14th day. On the other hand, the speed of decrease of the conventional article was slower than the article of the present invention, and changes were not observed after the 15th day.

Example 2

An experiment was conducted in substantially the same manner as in Example 1 except that an ammonia solution having a concentration of 50 mg/g was used as the waste liquid, and the ammonia adsorption capacity of the article of the present invention was compared with that of the conventional article.

Figure 2:
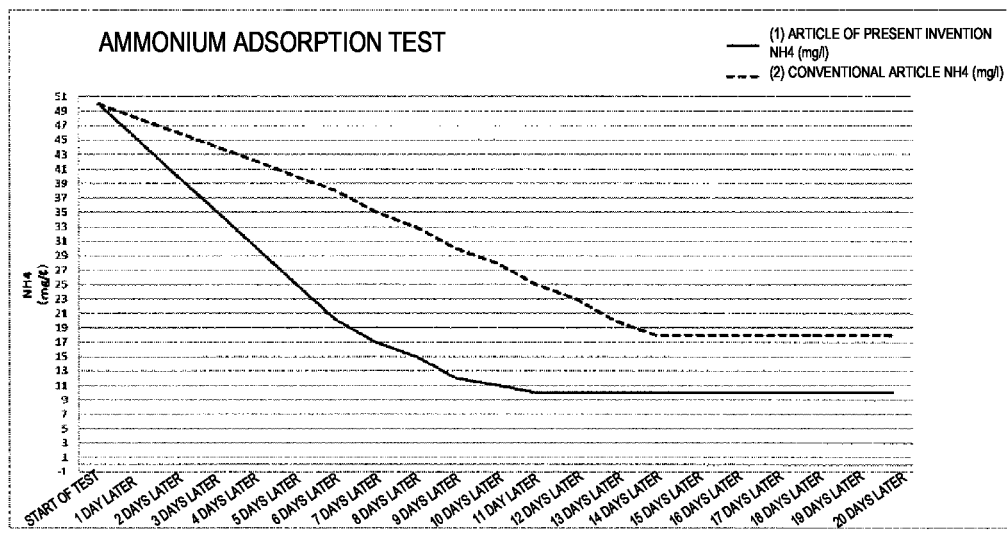
FIG. 2 is a graph showing the result of a comparative test of the ammonia adsorption capacity between the article of the present invention and the conventional article in Example 2.

FIG. 2 shows the result. The ammonia adsorption was 4.00 mg/g for the article of the present invention and 3.20 mg/g for the conventional article. It was found that the article of the present invention was superior in adsorption capacity. The ammonia concentration in the wastewater more quickly decreased in the case of the article of the present invention.

Example 3

An experiment was conducted in substantially the same manner as in Example 1 except that a nitrous acid solution having a concentration of 50 mg/g was used as the waste liquid, and the adsorption capacity of nitrous acid ions of the article of the present invention was compared with that of the conventional article.

Figure 3:
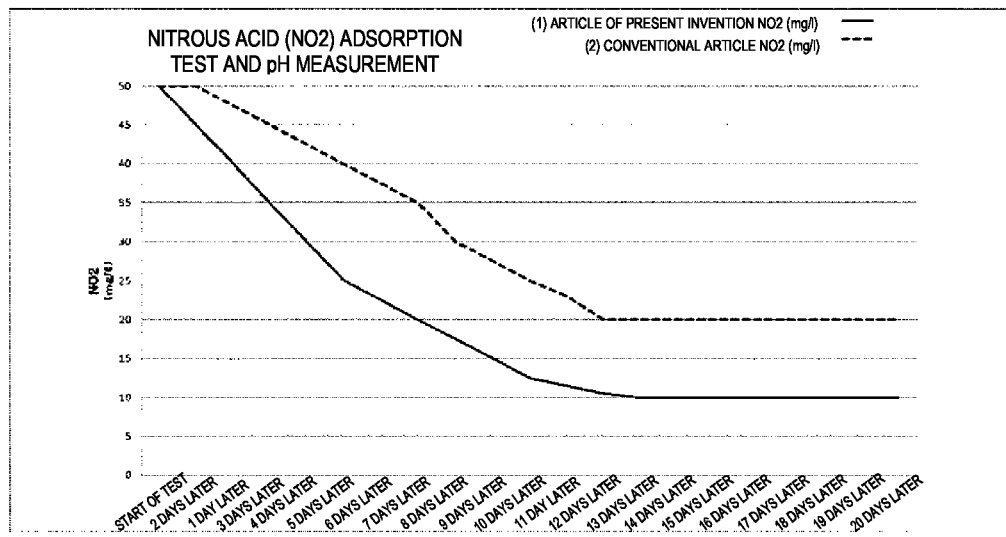
FIG. 3 is a graph showing the result of a comparative test of the nitrous acid (NO2) adsorption capacity between the article of the present invention and the conventional article in Example 3.

FIG. 3 shows the result. The nitrous acid ion adsorption was 4.00 mg/g for the article of the present invention and 3.00 mg/g for the conventional article. It was found that the article of the present invention was superior in adsorption capacity.

Until the nitrous acid concentration was reduced to half, 7 days elapsed in the case of the article of the present invention, and 10 days elapsed in the case of the conventional article. The nitrous acid concentration gradually decreased after that to 10 mg/g 10 days later in the case of the article of the present invention and 20 mg/g 11 days later in the case of the conventional article and remained on the same level after this.

Example 4

An experiment was conducted in substantially the same manner as in Example 1 except that a nitric acid solution having a concentration of 50 mg/g was used as the waste liquid, and the adsorption capacity of nitric acid ions of the article of the present invention was compared with that of the conventional article.

Figure 4:
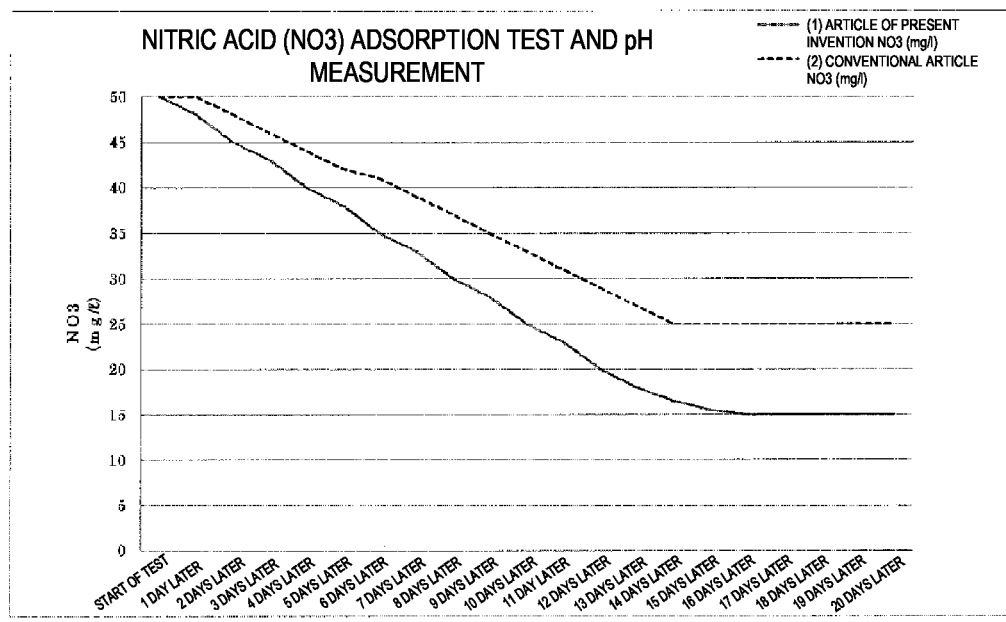
FIG. 4 is a graph showing the result of a comparative test of the nitric acid (NO3) adsorption capacity between the article of the present invention and the conventional article in Example 4.

FIG. 4 shows the result. The nitric acid ion adsorption was 3.50 mg/g for the article of the present invention and 2.50 mg/g for the conventional article. It was found that the article of the present invention was superior in adsorption capacity.

Until the nitric acid concentration was reduced to half, 9 days elapsed in the case of the article of the present invention, and 14 days elapsed in the case of the conventional article. The nitric acid concentration gradually decreased after that to 15 mg/g 14 days later in the case of the article of the present invention and 25 mg/g 14 days later in the case of the conventional article and remained on the same level after this.

Example 5

The experimental method: Into circulating pump filters, 20 g of the article of the present invention prepared in Example 1 and 20 g of the conventional article were respectively charged, aquarium fish were reared in 10-L water tanks, and changes in appearance were observed.

In each water tank, 10 neon tetras were reared with 1.5 L of gravel for floor sand "Soil" (trade name) used as the floor sand and water plants.

Figure 5:
FIG. 5 shows photographs of the states of adhesion of blue-green algae to glass surfaces of fish rearing tanks.

FIG. 5 shows photographs of blooms of blue-green algae on glass surfaces of the water tanks when the rearing water in the tropical fish rearing tanks was purified using the article of the present invention and the conventional article used in Example 1.

Adhesion of blue-green algae was observed on the 20th day in the case of the conventional article, but slight adhesion of blue-green algae was observed on the 30th day in the case of the article of the present invention.

The invention claimed is:

1. A water purifying material having a composition of 30 to 40% total iron, 1 to 5% titanium, 0.1 to 1% magnesium, and 0.1 to 0.8% silica (silicon).

2. A method for manufacturing a water purifying material, comprising:

adding caustic soda to a solution containing 200 to 100 mg/L of bivalent iron, 20 to 100 mg/L of titanium ions, 5 to 50 mg/L of magnesium, and 3 to 30 mg/L of silica under conditions of 30 to 50° C. and pH 6.8 to 7.2 to carry out neutralization and reaction;

separating and collecting an obtained solid at 100° C. or less; and drying the collected solid.

3. The method for manufacturing a water purifying material according to claim 2, wherein the solution is prepared by combining a waste liquid discharged from a manufacturing process of polyferric sulfate and a waste liquid discharged from a pickling process relating to the steel industry.

4. The method for manufacturing a water purifying material according to claim 2, wherein iron in the solution includes ferric sulfate ($Fe^{+3}$) or a mixture of ferric sulfate ($Fe^{+3}$) and ferrous sulfate ($Fe^{+2}$).

5. The method for manufacturing a water purifying material according to claim 3, wherein iron in the solution includes ferric sulfate ($Fe^{+3}$) or a mixture of ferric sulfate ($Fe^{+3}$) and ferrous sulfate ($Fe^{+2}$).

* * * * *